United States Patent Office 2,709,673
Patented May 31, 1955

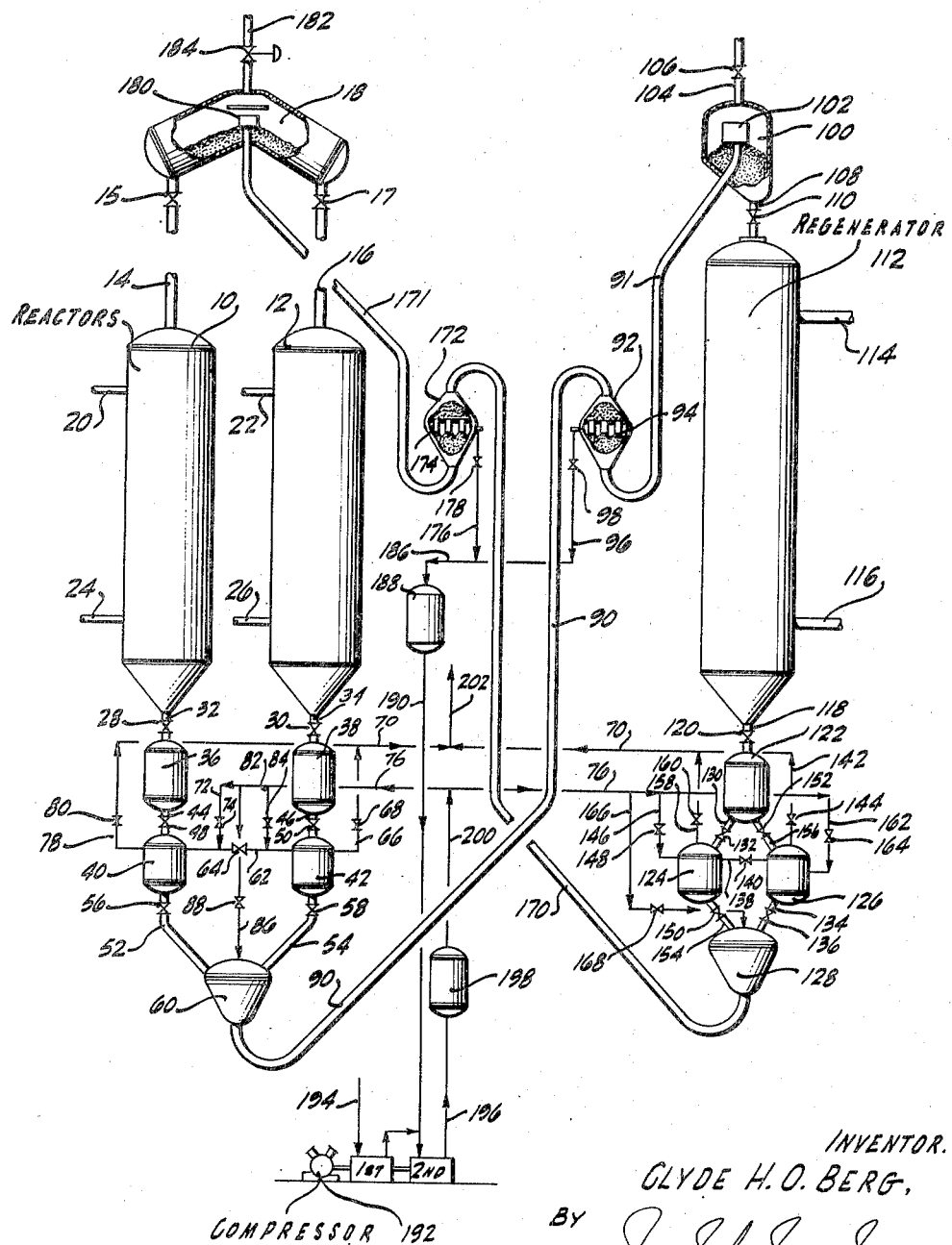

2,709,673

PROCESS AND APPARATUS FOR SOLIDS CONVEYANCE IN THE CONVERSION OF HYDROCARBONS

Clyde H. O. Berg, Long Beach, Calif., assignor to Union Oil Company of California, Los Angeles, Calif., a corporation of California Application May 27, 1950, Serial No. 164,837

27 Claims. (Cl. 196—52)

This invention relates to improvements in operations involving the contacting of gases or vapors with moving solids. More particularly this invention relates to an improved process and apparatus for the continuous contacting of gases and vapors with a substantially compact moving bed of catalyst or other solids for carrying out chemical reactions. Specifically this invention involves an improved method and apparatus for conveying solids employed in moving bed operations in which the solids are conveyed in substantially compact form under the influence of a concurrently flowing and depressuring conveyance fluid as hereinafter more fully described.

Operations employing moving beds of substantially compact solids, such as catalysts for chemical reactions, are well known in the art and perhaps the most publicized example is the T. C. C. process for catalytic cracking of hydrocarbons. In this process a regenerator and a reactor are employed in separate vessels, the catalyst being passed in substantially compact form downwardly by gravity through each vessel. A pair of bucket elevators are used to raise the catalyst from the bottom of each vessel for introduction into the top of the other. While elevators of this type are efficient from an energy requirement standpoint, they are somewhat difficult to maintain at the operating temperatures of from 800° F. to 1100° F. and considerable grinding of solids to fines is experienced.

The primary object of the present invention is to provide an improved process and apparatus for carrying out operations involving the contact of gases or vapors with granular solids either in substantially compact form or where fluidized particles of catalyst, oil shale, coke, tar sand and the like are treated at elevated temperatures or where solid particles are merely heat treated such as in lime burning.

A further object of this invention is to provide an improved process and apparatus for the contacting of gaseous or vaporous reactants with a substantially compact moving bed of granular catalyst.

Another object of this invention is to provide in operations involving moving beds of solids an improved method and apparatus for conveying these solids in the absence of elevators or other moving mechanical devices from the bottom of a vessel to the top of the same or different vessel substantially without abrasion or attrition loss.

A more specific object of the present invention is to provide in moving bed operations an improved method for conveying such solids in substantially compact form upwardly through lift lines from the bottom to the top of the same or a different vessel in the presence of a concurrent flow of depressuring lift gas.

An additional object of the present invention is to provide a process and apparatus having the aforesaid improved solids conveyance operation in the refining of fractions of crude petroleum wherein said fractions are contacted at reaction temperature and pressure conditions with a substantially compact moving bed of solids such as a catalyst in such petroleum refining operations as cracking, coking, hydroforming, and desulfurization as well as others.

It is a further object of the present invention to provide an improvement in the process and apparatus for the conveyance of granular solids in which the energy required is considerably reduced.

It is an additional object of the present invention to provide a continuous solids-fluids contacting process including a solids regeneration step in which the granular solids are recirculated through conveyance conduits in substantially compact form by means of a recycling stream of depressuring conveyance fluid.

Other objects and advantages of the present invention will become apparent to those skilled in the art as the description and illustration thereof proceeds.

Briefly, the present invention comprises a method and apparatus in which a continuous downward flow of granular solids in substantially compact form is maintained through a vessel or vessels and through which gaseous or vaporous constituents are passed in direct contact with the solids for chemical conversion or reaction. The granular solids collecting in the bottom of the vessel are removed therefrom and are then transferred upwardly in substantially compact form through a lift line or conduit to the top of the same or a different vessel for passage downwardly therethrough in substantially compact form. The upward flow of solids through the lift lines is effected by a concurrent flow of depressuring lift fluid, the frictional forces of which, acting against the granular solids by flowing through the interstices thereof, are sufficient to counteract the forces of gravitation and friction of moving solids against the walls of the conduit. The depressuring fluid generates a pressure drop per unit length of conduit $$\frac{dp}{dl}$$

sufficient to overcome the gravitational force in the opposite direction ($\rho_s \cos \theta$) wherein $\rho_s$ is the bulk density and $\theta$ is the angular deviation of the conveyance line from the vertical. The ratio of the former to the latter, $$\frac{\frac{dp}{dl}}{\rho_s \cos \theta}$$

is termed the conveyance force ratio and a value greater than 1.0 (factors in consistent units) is required for solids conveyance.

The solids are discharged from the upper end of the lift line in such a manner as to maintain their compact condition within the lift line while disengaging the lift fluid from the solids without effecting suspension of any of the granular solids. The characteristic of such an operation is that the moving solids are in substantially compact form throughout the entire conduit through which they flow completely preventing the impact of the solids particles against other particles or conduit surfaces which is one of the principal causes of solids loss by attrition.

In most moving bed operations involving the use of solids such as catalysts, at least two individual operations or reactions are effected; namely, the reaction step and regeneration step. In the former, the catalyst is contacted with reactants to form products and a spent catalyst, and in the latter step the spent catalyst is contacted with some form of a regeneration fluid to form a spent regeneration fluid and regenerated solids which are returned to the first step. Often the fluids employed in the regeneration step are not compatable with the fluids being treated in the reaction step and care must always be taken to insure that no mixing of these fluids occurs. This is particularly true in catalytic hydrocarbon cracking operations in which the fluid in the reaction step is gas oil or naphtha vapor and the fluid in the regeneration step is a mixture of air and flue gas.

Another characteristic of the present invention involves the combination of pressuring chambers by means of which the granular solids are transferred from the bottom of the contacting vessels and introduced into the conveyance conduit or lift line for conveyance to the top of the other contacting vessel. An additional characteristic of the present invention lies in the removal of a portion of the conveyance fluid from points along the length of the line thereby reducing the velocity of the conveyance fluid therein and returning this gas to an interstage inlet of the multistage conveyance fluid compressor. By a combination of the arrangement of the pressuring chambers and the removal of conveyance fluid from the conveyance conduit it has been found that a considerable increase in the quantity of solids transported may be realized for the same expenditure of energy previously required.

In a solids contacting process in which one vessel comprises a reactor and a second vessel comprises a spent solids regenerator, the granular solids are conveyed through the operational steps above described. An induction chamber is maintained at the inlet of each conveyance conduit. Each of these induction chambers is operated at a substantially constant pressure and discharges a substantially continuous stream of granular solids into the conveyance conduit. Granular solids removed from the reactor for example are introduced into a surge chamber maintained constant at the reactor pressure. The surge chamber communicates with a pressuring chamber which in turn communicates with the induction chamber. The pressuring chamber is first depressured to the reactor pressure and filled with granular solids from the surge chamber. Subsequently it is isolated from the surge chamber, pressured to the induction chamber pressure, and the granular solids are passed from the pressuring chamber into the induction chamber. The induction chamber is provided with a relatively large surge volume so as to maintain a continuous output of granular solids into the conveyance conduits.

In a system involving two or more parallel solids-fluid contacting vessels, each vessel is provided at its lower granular solids outlet with a surge chamber and a pressuring chamber which are operated in alternation so as to provide a substantially continuous discharge of granular solids from the pressuring chambers into a single induction chamber or the plurality of contacting vessels may discharge into a single surge vessel if desired and a minimum of two pressuring chambers may be used to transfer solids therefrom into the induction chamber.

In a system involving a single reactor or other solids-fluid contact vessel a single surge chamber is provided which feeds granular solids into a pair of pressuring chambers operated in alternation to provide a substantially constant granular solids flow into the induction chamber which feeds into the conveyance conduit for transporting granular solids removed from such a vessel.

One characteristic of the present invention lies in the depressuring of a pressuring chamber at the induction chamber pressure into another pressuring chamber at the surge chamber pressure. In such a step an equilibrium pressure intermediate between the surge chamber pressure and the induction chamber pressure will result materially reducing the quantity of high pressure fluid required in pressuring the pressuring chambers up to the induction chamber pressures.

The process and apparatus of the present invention is more easily described and understood in connection with the accompanying drawing which illustrates schematically a catalytic cracking process involving a moving bed of solid granular catalyst and in which a pair of reactors are operated in parallel. A single catalyst regenerator is employed to treat the spent catalyst discharged from the reactors. It is of importance to note that the pressuring system for handling granular solids at the bottom of the reactors is the same in principle to that employed at the bottom of the regenerator, the granular solids passing first into a surge chamber operating at the same pressure as the vessels from which the solids were removed, the solids then passing into pressuring chambers which are alternately pressured and depressured to and from the pressures of the induction chamber and the surge chamber respectively. If parallel regenerators were employed, the same surge and pressuring chamber scheme is used as is used in handling granular solids from the reactors. In the case of using a single reactor a solids handling scheme of surge and pressuring chambers would be used as is shown at the bottom of the regenerator.

In the drawing, the apparatus of the present invention is provided with reactors 10 and 12 provided with granular solids inlets 14 and 16 respectively, introducing granular catalyst solids from regenerated catalyst hopper 18. The granular catalyst passes downwardly through the reactors as a substantially compact moving bed of solids to be directly contacted by hydrocarbon fluids to be reacted or converted. Inlets 20 and 22 are provided for the introduction of such fluids and outlets 24 and 26 are provided for the removal of reaction or conversion products in a concurrent type of contacting operation. For counter-current flow the reactants may be introduced via lines 24 and 26 and the products removed via lines 20 and 22.

The apparatus employed for transferring granular solids from the reactors is typical of the conveyance means in this invention as applied to the removal and conveyance of solids from two or more vessels. If desired a single surge chamber may be employed with inlets from the plurality of reactors and outlets into two or more pressuring chambers. A single pressuring chamber may be used but is not preferred since the surge volume of the induction chamber increases as does the power required for pressuring and depressuring.

The granular solids passing through reactors 10 and 12 flow at a rate governed by control valves 28 and 30 respectively, the granular solids passing via transfer lines 32 and 34 into surge chambers 36 and 38, respectively. These surge chambers are maintained constantly at substantially the same operating pressure as reactors 10 and 12 thus insuring a continuous flow of solids from the reactors to the respective surge chambers. From the surge chambers, alternately, granular solids are withdrawn and passed to their respective pressure chambers 40 and 42 by means of transfer lines 44 and 46 controlled by automatic cycle valves 48 and 50, respectively. Pressure chambers 40 and 42 are provided respectively with transfer lines 52 and 54 controlled by automatic cycle valves 56 and 58 and by means of which solids are charged into reactor induction zone 60. Thus, when pressuring chamber 40 is depressured to the reactor pressure, chamber 42 is pressured to the same pressure as induction chamber 60. In this part of the cycle, pressuring chamber 40 is being filled from surge chamber 36 and pressuring chamber 42 is being emptied via transfer line 54 into induction chamber 60. When pressuring chamber 40 is filled and chamber 42 is emptied of catalyst, valves 48 and 58 are closed and the high pressure fluids in pressuring chamber 42 are partly depressured via line 62 controlled by automatic cycle valve 64 into pressuring vessel 40 bringing the pressure of the two vessels to some intermediate equilibrium pressure. Valve 64 is then closed isolating the two pressuring vessels. Pressuring chamber 42 is then further depressured from the intermediate equilibrium pressure to the reactor pressure via line 66 controlled by cycle valve 68 by discharging fluids into low pressure manifold 70. At the same time pressuring vessel 40 is pressured from the intermediate pressure to the reactor induction chamber pressure by introducing high pressure fluids via line 72 controlled by cycle valve 74 from high pressure fluid manifold 76. At this point valves 56 and 50 are opened and granular solids from pressuring chamber 40 flow via transfer line 52 into reactor induction chamber 60 while granular solids flow from surge chamber 38 via transfer line 46 into pressuring chamber 42. When pressuring chamber 40 is emptied and pressuring chamber 42 is filled, valves 50 and 56 are closed, valve 64 is reopened, the high pressure fluids present in pressuring chamber 40 depressure into pressuring chamber 42 via line 62 establishing the intermediate equilibrium pressure as before. Valve 64 is then closed, pressuring chamber 40 is depressured to low pressure manifold 70 by means of line 78 controlled by cycle valve 80 and pressuring vessel 42 is pressured from high pressure manifold 76 via line 82 controlled by cycle valve 84. Cycle valves 48, 50, 56, 58, 64, 68, 74, 80, and 84 are automatically operated in a predetermined time cycle to repeat the operation of pressuring and depressuring, filling and emptying of pressuring chambers 40 and 42 described.

A continuous granular solids flow empties into surge chambers 36 and 38. Because of their surge capacity an intermittent removal of granular solids therefrom into the respective pressuring chambers does not disturb the uniformity of granular solids flow through the reactors proper. Because of the surge capacity of the reactor induction chamber 60, the substantially constant flow of granular solids therefrom is not disturbed by the intermittent introduction of granular solids from pressuring chambers 40 and 42. Therefore, by supplying reactor induction chamber 60 with a supply of high pressure conveyance fluid via line 86 controlled by valve 88 from high pressure manifold 76 a substantially constant flow of compact granular solids from induction chamber 60 is maintained by gravity into the conveyance zone and under the influence of depressuring conveyance fluid through the lower or primary section 90 of the spent solids conveyance conduit. A similar solids flow takes place in the regenerated solids conveyance conduit.

The conveyance conduit consists essentially of a lower or primary section 90 and an upper or secondary section 91. The two sections are separated by a conveyance fluid disengaging chamber 92. Granular solids are discharged into disengaging chamber 92 and a portion of the conveyance fluid entering with the granular solids is removed from disengaging tray 94 via line 96 at a rate controlled by valve 98. In this manner the quantity and consequently the velocity of the conveyance fluid flowing through the conveyance conduit at this point is reduced thereby decreasing the required cross sectional area of the secondary section of the spent solids conveyance conduit. The granular solids pass downwardly through disengaging tray 94, passing from the lower opening of disengaging chamber 92, and are conveyed through upper section 91 of the conveyance conduit under the influence of the depressuring remaining portion of conveyance fluid into spent solids separating chamber 100. A restrictive force is applied by means 102 whereby the granular solids in the conveyance conduit are maintained in substantially compact form. The conveyance fluid discharging from the conveyance conduit with the granular solids is removed from separator chamber 100 via line 104 controlled by valve 106 which may comprise a back pressure regulator or a flow recorder controller. The spent granular solids thus conveyed pass from separator chamber 100 via transfer line 108 at a rate controlled by valve 110 into regenerator 112. The granular solids pass downwardly therethrough in substantially compact form and are contacted directly with an oxygen-containing gas for regeneration of the spent solids (in the case of hydrocarbon conversion processes) or with other regeneration or heating fluids. These fluids thus introduced enter via inlet 114 and leave via outlet 116 in concurrent flow with the inlets and outlets may be reversed for countercurrent flow. If required means not shown comprising steam generating coils for example may be provided in regenerator 112 for the dissipation of the exothermic heat released during regeneration. The regenerated granular solids thus formed are removed via transfer line 118 at a rate controlled by valve 120 and are treated as subsequently described for conveyance to regenerated solids hopper 18.

The system for handling the regenerated granular solids is typical of the apparatus of this invention for removing granular solids from a single column and introducing it into the conveyance conduit. It consists of surge chamber 122, pressuring chambers 124 and 126, and regenerated solids induction chamber 128. In alternation pressuring chambers 124 and 126 are pressured and depressured to and from the pressure of regenerator induction chamber 128 and the pressure of regenerator 112. The surge chamber 122 is operated at the same pressure as that of the regenerator. While pressuring chamber 124 is depressured and pressuring chamber 126 is pressured, granular solids pass from surge chamber 122 via transfer line 130 controlled by cycle valve 132 into pressuring chamber 124 while granular solids pass from pressuring chamber 126 via transfer line 134 controlled by cycle valve 136 into regenerated solids induction chamber 128. When pressuring chamber 124 is full and chamber 126 is empty, cycle valves 132 and 136 are closed. The high pressure fluids present in chamber 126 are then depressured into chamber 124 via line 138 controlled by cycle valve 140 bringing the two chambers to an intermediate pressure at equilibrium. Cycle valve 140 is then closed and chamber 126 is depressured to the regenerator pressure via line 142 controlled by cycle valve 144 while chamber 124 is pressured to the pressure of regenerated solids induction chamber 128 by means of high pressure gas flowing via line 146 controlled by cycle valve 148 from high pressure fluid manifold 76. Subsequently cycle valves 150 and 152 are opened so that granular solids pass via transfer line 154 from pressuring chamber 124 to induction chamber 128 and via transfer line 156 from surge chamber 122 to pressuring chamber 126. When chamber 124 is emptied and chamber 126 is full, cycle valves 152 and 150 are closed, and the high pressure fluids in pressuring chamber 124 are depressured via line 138 bringing pressuring chambers 124 and 126 to an intermediate equilibrium pressure. Pressuring chamber 124 is further depressed via line 158 controlled by cycle valve 160 into low pressure manifold 70 while pressuring chamber 126 is pressured to the pressure of induction chamber 128 via line 162 controlled by cycle valve 164. Again, as in the system for handling the spent granular solids, the cycle valves are operated automatically on a time cycle to permit the introduction of granular solids from surge chamber 122 alternately into pressuring chambers 124 and 126 and from these last-named chambers alternately into regenerated solids induction chamber 128. Because of the surge capacity of surge chamber 122 the alternate removal of solids therefrom does not effect the flow rate of granular solids in the regenerator and because of the surge volume in induction chamber 128 the alternate introduction of granular solids thereinto from pressuring chamber 124 and 126 does not effect the constant discharge of granular solids from the induction chamber.

Regenerated solids induction chamber 128 is provided with a continuous supply of fluids from high pressure fluid manifold 76 via line 166 controlled by valve 168. The conveyance fluid thus introduced is depressured concurrently with a continuous flow of substantially compact granular solids from induction chamber 128 through the regenerated solids conveyance conduit consisting of lower or primary section 170 and upper or secondary section 171. These two sections are separated by conveyance fluid disengaging chamber 172. Disengaging chamber 172 is provided with a transverse disengaging tray 174 from which a portion of the conveyance fluid is removed via line 176 at a rate controlled by valve 178. The conveyance fluid thus removed may be combined with that removed from disengaging chamber 92 previously described. The gases thus removed will be discussed below.

The granular solids being depressured in substantially compact form through upper section 171 of the regenerated solids conveyance conduit discharge into solids hopper 18. A restrictive force to the discharging solids is provided by means 180 whereby the granular solids in the conveyance conduit are maintained in substantially compact form. The conveyance fluids are disengaged in hopper 18 from the discharged granular solids and are removed from the hopper via line 182 controlled by valve 184. Within hopper 18 the granular solids are divided, in the present illustration, into two streams passing respectively into reactors 10 and 12 via lines 14 and 16 at rates controlled by valves 15 and 17. The solids then recirculate through the reactors as described above.

Returning now to the conveyance fluids disengaged from disengaging chambers 92 and 172, these fluids are joined in manifold 186 and pass through cooler and dust remover 188. Since in most catalytic and thermal processes the granular solids conveyed are at a temperature of the order of 800° F. to 1100° F., the conveyance fluid thus removed is at substantially the same temperature. Furthermore, a certain amount of dust is generated which is picked up by the gas streams disengaged from direct contact with the solids. The gas thus disengaged from the disengaging chambers 92 and 172 therefore is cooled and filtered by any one of a number of means to provide a cool dust-free conveyance fluid at a pressure intermediate between that of the induction chambers 60 and 128 and the pressures of hopper 18 and separator chamber 100. The thus treated conveyance fluid subsequently passes via line 190 into an interstage of multi-stage conveyance fluid compressor 192. This gas is joined by conveyance fluid introduced via line 194 into the first stage of compressor 192 and the total is compressed ultimately to a pressure somewhat greater than that of high pressure manifold 76. The high pressure gas is conveyed via line 196 into high pressure conveyance fluid surge chamber 198. The surge chamber provides a source of high pressure fluid to place a more or less uniform load on compressor 192 since the demands of high pressure fluid in the process are not quite uniform. High pressure fluid is introduced into high pressure manifold 76 via line 200.

Gas is removed from the low pressure manifold 70 by means of line 202 and is usually discarded and vented to the atmosphere. It may however, be recycled in accordance with a modification of the present invention described subsequently.

*Example*

The principles of the present invention were applied to a catalytic cracking process involving two systems each of which is similar to the apparatus outlined in the drawing. A catalyst circulation of 500 tons per hour of synthetic bead cracking catalyst was maintained in each system. The catalyst granules had a bulk density of 45 pounds per cubic foot. The reactor surge chambers operate at a pressure of 25 pounds per square inch absolute and had a volume of 239 cubic feet each. The reactor pressuring chambers each had a volume of 159 cubic feet. The reactor induction chamber had a volume of 599 cubic feet and operated at a pressure of 95 pounds per square inch absolute.

The regenerator operated at a pressure of 16.2 pounds per square inch absolute. The regenerator surge chamber had a volume of 500 cubic feet and operated at a pressure of 16.2 pounds per square inch absolute. The regenerator pressuring chambers had a volume of 159 cubic feet each and were operated in pressure between the limits of 16.2 and 95 pounds per square inch absolute. The regenerator induction chamber had a volume of 600 cubic feet and was operated at 95 pounds per square inch absolute. The primary and secondary sections of both the spent solids conveyance conduit and the regenerated solids conveyance conduits were tapered, increasing in diameter from a minimum of 12 inches at the inlet to a maximum of 21.3 inches at the outlets of each of the four sections in order to maintain the conveyance force ratio at a substantially constant value throughout the length of the conduits. The conveyance fluid disengaging chambers were vessels having a maximum diameter of 4 feet and the chamber was constructed with an upper 45° cone and a lower 60° cone with a lower 4-foot base coinciding. The energy required to convey the 500 tons per hour circulation of granular solids was 364 adiabatic horsepower. The conveyance fluid employed was air, being introduced into the inlet of the first stage of the compressor at a pressure of 14.7 pounds per square inch absolute and at a rate of 1949 standard cubic feet per minute. In the first stage of the compressor this air was compressed to an interstage pressure of 41.2 pounds per square inch absolute and was joined with 828 standard cubic feet per minute of conveyance fluid removed from lift line disengaging chambers. In the second stage of the compressor, the combined stream of 2777 standard cubic feet per minute of air is compressed to a pressure of 115 pounds per square inch absolute and introduced into the high pressure fluid manifold. In operation, the intermediate pressure at equilibrium in the reactor pressuring chambers was 66.7 pounds per square inch absolute and the equilibrium pressure in the regenerator pressuring chambers was 63.3 pounds per square inch absolute.

The foregoing process is employed to catalytically crack 15,000 barrels per day of straight run and cracked gas oil at a temperature of 835° F. with a catalyst-to-oil weight ratio of 5.16. The horsepower requirement for the conveyance of granular solids according to this invention is 24% of that required for conveyance of the solids as a suspension in a gas lift process and considerably less than that required for conveyance of the solids with bucket elevators. The attrition rate of the granular solids in the process of the present invention is also well below that encountered with either the gas suspension lift or bucket elevator type conveyances.

With reference to the drawing, the foregoing example involves an operation in which the separator chamber above the regeneration vessel and the catalyst hopper above the reactors were operated at 1.5 pounds per square inch gauge pressure. Since the reactors were operated at about 24.7 pounds per square inch absolute, transfer lines 14 and 16 were actually sealing legs 16 inches in diameter and 80 feet in length. The conveyance fluid discharged from separator 100 and hopper 18 was vented to the atmosphere.

A desirable modification of the present invention lies in operating hopper 18 at substantially the same pressure as that of reactors 10 and 12, namely 24.7 pounds per square inch absolute. By so doing the lengthy sealing legs 14 and 16 may be eliminated and the granular catalyst introduced directly from hopper 18 into the reactors. The conveyance fluid removed from hopper 18 at a pressure of 24.7 pounds per square inch absolute may be introduced into the low pressure stage of compressor 192 further decreasing the horsepower requirements. The low pressure fluid from reactor pressuring chambers 40 and 42 is also discharged at the same pressure and may be combined with the conveyance fluid from hopper 18. These off gases must of course be cooled and filtered to remove dust particles before recompression.

Another desirable modification of the present invention is the incorporation in separator 102 and/or hopper 18 with provision for elutriating granular solids fines from the circulating stream of solids. Thus, means 180 and 102 may comprise cylindrical chambers of cross sectional area greater than that of said conveyance conduit and through which the granular solids pass in countercurrent contact to all or a portion of the conveyance fluid thereby suspending the solids fines and removing them from the system. The incorporation in the process of such elutriation apparatus decreases the pressure drop of fluids passing through the regenerator and the reactors, increases the uniformity of catalyst contact with the fluids, and materially reduces the fluid by-passing effect known as "channelling" in the granular solids bed.

In another desirable modification of the present invention and which is particularly applicable to contacting processes in which a relatively large quantity of hydrocarbonaceous material is deposited on the granular solids, the conveyance fluid preferably comprises a relatively oxygen-free flue gas which may be recycled in the process or generated, compressed and depressured through the conveyance conduit and pressuring chamber described. In the example above, the catalyst-to-oil ratio was sufficiently high that the quantity of carbon laid down on the catalyst during the cracking operation was insufficient upon complete combustion in air to raise the temperature of the catalyst above the deactivation temperature. For such a situation fresh air is the most convenient conveyance fluid.

In some installations steam may be employed as the conveyance fluid but care must be taken to avoid use of this gas with catalysts which are steam deactivated. The compressed hydrocarbon gases such as methane, ethane, and the like, or natural gas, or cracked dry gases may also be employed as conveyance fluids. It is to be noted that in processes involving liquid contact with granular solids, a liquid conveyance fluid may be substituted and a conveyance conduit having constant cross sectional areas may be used. Liquid conveyance fluids may also be used with processes wherein vaporous fluids are contacted with solids.

It is to be understood that the present invention is not to be limited to the cracking process described above by way of illustration and that the novelty lies in the conveyance step of the operation and the combination of the pressuring and depressuring chambers with the conveyance conduits through which a depressuring conveyance fluid conveys compact granular solids as a continuous moving mass and from an intermediate point in which a portion of the conveyance fluid is withdrawn and returned to an intermediate stage of the conveyance fluid compressor.

Therefore, the conveyance process and apparatus of the present invention may be combined with virtually any other process involving a moving or recirculatory stream of granular solids.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for recirculating granular solids successively through a first and a second fluid contacting zone which comprises passing granular solids from said first contacting zone successively through a first surge zone, alternately into a plurality of first pressuring zones, introducing a relatively uniform flow of granular solids from said plurality of pressuring zones into a first induction zone, introducing a conveyance fluid into said induction zone, depressuring said conveyance fluid concurrently with said granular solids from said first induction zone through a first conveyance zone to a second separator zone, maintaining said granular solids in said conveyance zone in substantially compact form, flowing said granular solids from said second separator zone into said second contacting zone, flowing granular solids from said second contacting zone successively through a second surge zone and alternately into a plurality of second pressuring zones, passing said solids from said pressuring zones into a second induction zone, introducing a conveyance fluid into said second induction zone, depressuring said conveyance fluid from said second induction zone through a second conveyance zone into a first separator zone, maintaining said granular solids in said second conveyance zone in substantially compact form and as a continuously moving mass, flowing granular solids from said first separator zone into said first contacting zone, withdrawing at least a portion of said conveyance fluid from each of said first and second conveyance zones at an intermediate point therein, combining the fluid thus formed, repressuring said fluid, and introducing at least a portion thereof into said first and second induction zones.

2. A process according to claim 1 wherein said first contacting zone comprises a plurality of reaction zones, introducing granular solids into each of said plurality of reaction zones, passing solids from each of said plurality of reaction zones in succession through a surge zone and a pressuring zone, and from each of said pressuring zones into said first induction zone.

3. A process according to claim 1 wherein said first contacting zone comprises two elongated reaction zones, wherein said granular solids comprise a solid granular cracking catalyst, wherein said second contacting zone comprises a catalyst regeneration zone, introducing a separate stream of regenerated granular catalyst into each of said reaction zones, conveying by means of said first conveyance zone a stream of spent hydrocarbonaceous cracking catalyst into said regeneration zone, regenerating said spent catalyst in said regeneration zone by contacting the same with an oxygen-containing gas forming a regenerated catalyst, conveying said regenerated catalyst by means of said second conveyance zone to said first separator zone, maintaining said regenerated cracking catalyst at cracking conditions of pressure and temperature within said reaction zone, and contacting said catalyst therein with a hydrocarbon oil to be cracked.

4. A process according to claim 1 including the steps of operating each of said surge zones at a relatively low pressure, maintaining a substantially constant flow rate of granular solids from each of said reaction zones into the surge zone communicating therewith, maintaining said first induction zone at a relatively high pressure, and depressuring one of said pressuring zones while pressuring another of said pressuring zones by flowing fluids therebetween bringing both to an intermediate pressure.

5. A process according to claim 1 including the step of elutriating solid granular fines in at least one of said separating chambers, removing a conveyance fluid containing suspended solids fines therefrom, and flowing fines-free granular solids from said separator zone to the contacting zone communicating therewith.

6. A process according to claim 1 in combination with the steps of establishing a conveyance fluid disengaging zone at an intermediate point along each of said first and second conveyance zones, decreasing the conveyance fluid velocity to a relatively low value therein, removing a portion of said conveyance fluid from each of said disengaging zones substantially at the points therein of lowest velocity, and depressuring the remainder of said conveyance fluid through the remaining portion of each of said conveyance zones while maintaining the granular solids therein in substantially compact form.

7. A process according to claim 1 including the step of flowing said granular solids from said first and second induction zones by gravity into said conveyance zone and subsequently conveying said solids through said conveyance zone in substantially compact form under the influence of a depressuring conveyance fluid flowing at a sufficient rate to establish a conveyance force ratio having a value greater than 1.0.

8. A process according to claim 7 in combination with maintaining said conveyance force ratio at a substantially constant value throughout said conveyance zones.

9. A process for the conveyance of granular solids which comprises passing said granular solids from a surge zone into a pressuring zone at a relatively low pressure, raising the pressure of the latter zone to a relatively high pressure, flowing the granular solids into an induction zone, introducing thereinto a conveyance fluid at a high pressure relative to that at which solids are discharged after conveyance, depressuring said conveyance fluid concurrently with a substantially compact nonfluidized mass of granular solids from said induction zone through a primary conveyance zone into a disengaging zone, removing a part of said conveyance fluid from said disengaging zone, depressuring said granular solids in substantially compact form from said disengaging zone through a secondary conveyance zone with the remainder of said conveyance fluid, discharging granular solids and conveyance fluid from said secondary conveyance zone, and applying a restrictive force against solids discharging from said conveyance zones thereby maintaining the solids moving through said primary and secondary conveyance zones as a continuous compact nonfluidized porous moving mass of granular solids having substantially the same bulk density as a downwardly moving bed of said solids.

10. A process for the conveyance of granular solids which comprises establishing a first surge zone communicating with a first pressuring zone and a second surge zone communicating with a second pressuring zone, said first and second pressuring zones communicating with an induction zone, flowing granular solids as a downwardly moving bed from said first surge zone to said first pressuring zone at a relatively low pressure, flowing granular solids as a downwardly moving bed from said second pressuring zone to said induction zone at a relatively high pressure, subsequently depressuring said second pressuring zone to the same pressure as said second surge zone, pressuring said first pressuring zone to the pressure of said induction zone, flowing granular solids as a downwardly moving bed from said second surge zone to said second pressuring zone, flowing solids as a downwardly moving bed from said first pressuring zone to said induction zone, introducing a conveyance fluid into said induction zone, depressuring said conveyance fluid concurrently with a compact nonfluidized mass of granular solids through a conveyance zone communicating therewith, and applying a restrictive force against solids discharging from said conveyance zone thereby maintaining said granular solids in substantially compact nonfluidized form in said conveyance zone at a bulk density substantially the same as that of said downwardly moving beds of compact nonfluidized solids.

11. A process according to claim 10 wherein a substantially continuous flow of granular solids is maintained into said first and second surge zones.

12. A process according to claim 10 wherein one of said pressuring zones is depressured from a relatively high pressure to an intermediate pressure by placing said pressuring zone in communication with said second pressuring zone prior to pressuring said second pressuring zone to the pressure of said induction zone and depressuring the other of said pressuring zones to pressure its communicant surge zone.

13. A process according to claim 10 wherein a substantially constant flow rate of solids is maintained from said induction zone through said conveyance zone.

14. A process according to claim 10 wherein said first and second pressuring zones are alternately pressured and depressured to effect a relatively uniform rate of solids introduction into said induction zone.

15. A process according to claim 10 wherein a portion of said conveyance fluid is removed from an intermediate point in said conveyance conduit, is compressed, and at least part is reintroduced into said induction chamber.

16. A process for the conveyance of granular solids which comprises establishing a surge zone, first and second pressuring zones communicating therewith, said pressuring zones communicating with an induction zone opening into a conveyance zone, introducing solids to be conveyed into said surge zone, maintaining a relatively low pressure in said surge zone, maintaining a relatively high pressure in said induction zone, depressuring said first pressuring zone to said relatively low pressure while maintaining said second pressuring zone at said relatively high pressure, flowing granular solids as a moving bed from said surge zone into said first pressuring zone, flowing granular solids as a moving bed from said second pressuring zone into said induction zone, subsequently depressuring said second pressuring zone and pressuring said first pressuring zone to said relatively low pressures and relatively high pressure respectively, flowing granular solids as a moving bed from said surge zone into said second pressuring zone, flowing granular solids as a moving bed from said first pressuring zone into said induction zone, alternately pressuring and depressuring said pressuring zones to convey a relatively uniform flow of granular solids into said induction zone, introducing a conveyance fluid into said induction zone, depressuring said conveyance fluid through said conveyance zone concurrently with a substantially constant flow of compact nonfluidized granular solids, and applying a restrictive force against solids discharging from said conveyance zone thereby maintaining said granular solids therein in substantially compact nonfluidized form at a bulk density substantially the same as that of said moving beds.

17. A process according to claim 16 wherein a substantially constant flow of granular solids is maintained into said surge zone and granular solids are intermittently removed therefrom alternately into said first and second pressuring zones.

18. A process according to claim 16 wherein one of said pressuring vessels at a relatively high pressure is depressured by discharging fluid into the other of said pressuring vessels at a relatively low pressure bringing the two to an intermediate pressure, subsequently depressuring the one of said pressuring zones to said relatively low pressure while pressuring the other of said pressuring vessels to said relatively high pressure.

19. A process according to claim 16 in combination with the step of removing a portion of said conveyance fluid at an intermediate point along said conveyance zone, compressing the thus removed fluid, and returning at least part thereof to said induction zone.

20. An apparatus which comprises a first and a second contacting chamber adapted to the contact of granular solids and fluids, conduit and valve means for passing solids from said first contacting zone successively through a first surge zone, alternately into at least two first pressuring chambers, and alternately therefrom into a first induction chamber as a relatively uniform flow thereinto, an inlet conduit for conveyance fluid into said first induction chamber, a first conveyance conduit communicating said first induction chamber with a second separator chamber, means for depressuring said conveyance fluid therethrough, means for maintaining solids during conveyance therethrough in substantially compact form, a conduit for solids communicating said second separator chamber with said second contacting chamber, an outlet conduit from said second separator chamber for conveyance fluid, conduit and valve means for passing solids therefrom successively through a second surge chamber, alternately into at least two second pressuring chambers and alternately therefrom into second induction chamber as a relatively uniform flow thereinto, an inlet conduit for conveyance fluid into said second induction chamber, a second conveyance conduit communicating said second induction chamber with a first separator chamber, means for depressuring said conveyance fluid therethrough, means for maintaining solids during conveyance therethrough in substantially compact form, a conduit for solids communicating said first separator chamber with said first contacting chamber, an outlet conduit from said first separator chamber for conveyance fluid, outlet conduits from an intermediate point along the length of said first and second conveyance conduit, communicating with a fluid pressuring means and conduits therefrom for repressured fluid opening into said first and second induction chambers.

21. An apparatus for the conveyance of granular solids which comprises a surge chamber opening into at least one pressuring chamber, said pressuring chamber opening into an induction chamber, means for maintaining the pressure in said surge chamber at a relatively low and constant pressure, means for maintaining said induction chamber at a relatively high and constant pressure, means for pressuring and depressuring said pressuring chamber between the limits of said relatively low pressure and said relatively high pressure, means for flowing granular solids from said surge chamber to said pressuring chamber when the latter is depressured, means for flowing granular solids from said pressuring chamber to said induction chamber when the former is pressured, means for introducing a conveyance fluid into said induction chamber at said relatively high pressure, an elongated conveyance conduit communicating with said induction chamber, means for depressuring said conveyance fluid through a substantially compact moving mass of granular solids maintained in said conveyance conduit, a conveyance fluid disengaging chamber having a cross sectional area materially greater than that of said conveyance conduit maintained at a point intermediate the ends of said conveyance conduit, a disengaging tray within said disengaging chamber, an outlet conduit for at least part of said conveyance fluid from said disengaging chamber, means for compressing the thus withdrawn conveyance fluid, and means for returning at least a portion of the thus compressed conveyance fluid to said induction chamber.

22. An apparatus for the conveyance of granular solids which comprises a first and a second surge chamber, separate inlets for solids thereto, a first and a second pressuring chamber communicating in solids-receiving relation through a first pair of valved conduits with said first and second surge chambers respectively, an induction chamber communicating in solids-receiving relation through a second pair of valved conduits with said first and second pressuring chambers respectively, means for maintaining said surge chambers at a relatively low pressure, means for maintaining said induction chamber at a relatively high pressure by introduction of a conveyance fluid thereinto, means for pressuring and depressuring said pressuring chambers between said relatively high and low pressures as limits by introduction and removal of fluids, means for opening and closing said valved conduits in sequence to flow solids into said pressuring chambers when at said relatively low pressure and from said pressuring chamber when at said relatively high pressure, an elongated conveyance conduit in solids-receiving relation at its inlet with said induction chamber, means for maintaining the outlet of said conveyance conduit at a relatively low pressure to maintain flow of said conveyance fluid and solids therethrough, and means for applying a force against the solids discharging therefrom to maintain the moving solids therein at a bulk density substantially equal to that of a downwardly moving confined solids bed.

23. An apparatus according to claim 22 in combination with a valved conduit communicating said first and second pressuring chambers whereby upon opening the valve therein one chamber may be partially depressured by partially pressuring the other.

24. An apparatus according to claim 22 in combination with fluid disengaging means intermediate the ends of said elongated conveyance conduit for disengaging fluid from moving solids therein, a fluid compression means in fluid-receiving relation to said disengaging means, and a conduit for repressured fluid communicating said compression means with said induction chamber.

25. An apparatus for the conveyance of granular solids which comprises a solids surge chamber, an inlet conduit for solids opening thereinto, a first and second pressuring chamber each communicating in solids-receiving relation through a valved conduit with said surge chamber, an induction chamber communicating in solids-receiving relation through a pair of valved conduits with said pressuring chambers, means for maintaining said surge chamber at a relatively low pressure, means for maintaining said induction chamber at a relatively high pressure by introduction of a conveyance fluid thereinto, means for pressuring and depressuring said pressuring chambers between said relatively high and low pressures as limits by introduction and removal of fluids, means for opening and closing said valved conduits in sequence to flow solids into said pressuring chambers when at said relatively low pressure and from said pressuring chamber when at said relatively high pressure, an elongated conveyance conduit in solids-receiving relation at its inlet with said induction chamber, means for maintaining the outlet of said conveyance conduit at a relatively low pressure to maintain flow of said conveyance fluid and solids therethrough, and means for applying a force against the solids discharging therefrom to maintain the moving solids therein at a bulk density substantially equal to that of a downwardly moving confined solids bed.

26. In an apparatus for the conveyance of granular solids which comprises an elongated conveyance conduit, means for submerging the inlet thereof with a bed of solids to be conveyed, means for depressuring a conveyance fluid therethrough to convey said solids, and means for applying a force against solids discharging therefrom to maintain the solids moving through said conveyance conduit at substantially the same bulk density as that of a confined downwardly moving solids bed, the improved means for disengaging a portion of said conveyance fluid from said solids and removing it from said conduit at an intermediate point along the length thereof which comprises a conveyance fluid disengaging chamber having a materially greater cross-sectional area than that of said conveyance conduit and communicating in solids-receiving relation at its upper end with the first part of said conveyance conduit and communicating in solids-delivery relation at its lower end with the second part of said conveyance conduit and adapted to confine a downwardly moving bed of solids therein, a transverse tray disposed within said disengaging chamber below the solids inlet thereto, a plurality of open-ended tubes depending therefrom and through which said bed of solids passes forming a solids-free disengaging space around said tubes and below said tray, and a valved outlet conduit for fluid opening from said disengaging chamber at a point immediately below said tray.

27. An apparatus according to claim 26 wherein said disengaging chamber is provided with a conical upper portion and a conical lower portion, said transverse tray being disposed substantially at the coincident bases of said conical portions.

References Cited in the file of this patent

UNITED STATES PATENTS

| | | |
|---|---|---|
| 2,077,898 | Rolff | Apr. 20, 1937 |
| 2,331,433 | Simpson et al. | Oct. 12, 1943 |
| 2,435,158 | Read | Jan. 27, 1948 |
| 2,493,911 | Brandt | Jan. 10, 1950 |
| 2,509,983 | Morrow | May 30, 1950 |
| 2,541,077 | Leffer | Feb. 13, 1951 |
| 2,546,625 | Bergstrom | Mar. 27, 1951 |
| 2,561,771 | Ardern | July 24, 1951 |

FOREIGN PATENTS

| | | |
|---|---|---|
| 180,397 | Great Britain | May 11, 1922 |
| 484,325 | Germany | Apr. 30, 1927 |

OTHER REFERENCES

"Development of Houdriflow Catalytic Cracking," Bland et al., Houdry Pioneer, vol. 5, No. 1, Feb. 1950, pages 5 to 7.